United States Patent [19]

Valantin

[11] 4,345,854
[45] Aug. 24, 1982

[54] APPARATUS FOR LAYING UNDERWATER PIPELINES

[75] Inventor: Alfred Valantin, Clermont, France

[73] Assignee: Techniques Industrielles et Minieres, Paris, France; a part interest

[21] Appl. No.: 52,238

[22] Filed: Jun. 26, 1979

[30] Foreign Application Priority Data

Jun. 29, 1978 [FR] France .................. 78 19467

[51] Int. Cl.³ ............................... F16L 1/04
[52] U.S. Cl. .................... 405/159; 405/155; 405/170; 405/192; 405/179
[58] Field of Search .............. 405/185, 192, 158, 166, 405/169, 170, 155, 159, 179; 285/96, 97

[56] References Cited

U.S. PATENT DOCUMENTS

| | | | |
|---|---|---|---|
| 3,393,524 | 7/1968 | Terrell | 405/185 |
| 3,514,962 | 6/1970 | Poole | 405/170 |
| 3,785,160 | 1/1974 | Banjavich et al. | |
| 3,860,270 | 1/1975 | Arnold | 285/96 X |
| 3,975,784 | 8/1976 | Whitaker | |

FOREIGN PATENT DOCUMENTS

| | | |
|---|---|---|
| 1289421 | 2/1962 | France . |
| 1320979 | 2/1963 | France . |
| 1537130 | 7/1968 | France . |
| 2275325 | 1/1976 | France . |
| 2503618 | 7/1975 | Fed. Rep. of Germany . |

*Primary Examiner*—David H. Corbin
*Attorney, Agent, or Firm*—Young & Thompson

[57] ABSTRACT

Underwater pipelines connected to at least one point on a coastline are constructed by means of a pipelaying vessel associated with an independent underwater vehicle mounted on caterpillar-tracks and capable of traveling along the sea bed. From within the vehicle, pipe sections can be assembled and rejected as the vehicle moves forward. The pipe sections pass through a wall of the vehicle and into the sea, through a port which is provided with a plurality of inflatable annular sealing rings that selectively sealingly bear against the exterior of the pipeline. One of these sealing rings is associated with an annular piston, and a jack acts between this piston and the vehicle to provide the propulsive force for ejecting the pipe sections from the vehicle. Potential applications include mining operations, off-shore installations and intercontinental tunnels.

19 Claims, 21 Drawing Figures

FIG_1

FIG._3

FIG_6

FIG_8

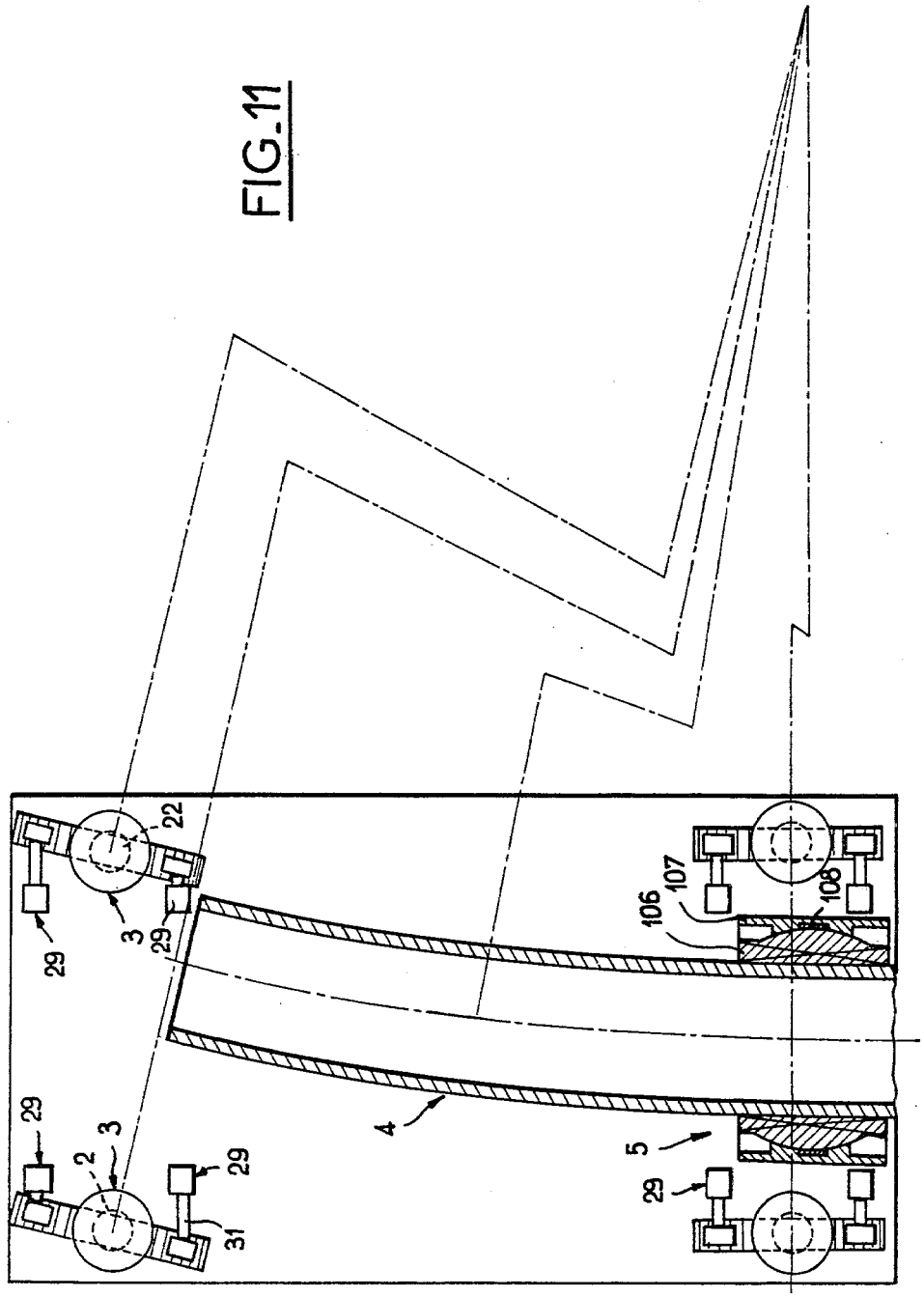

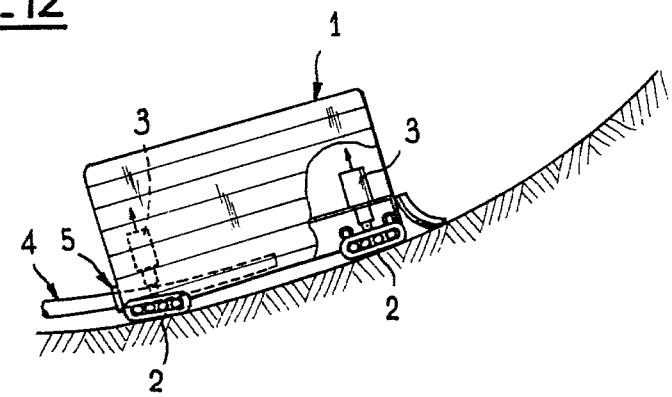
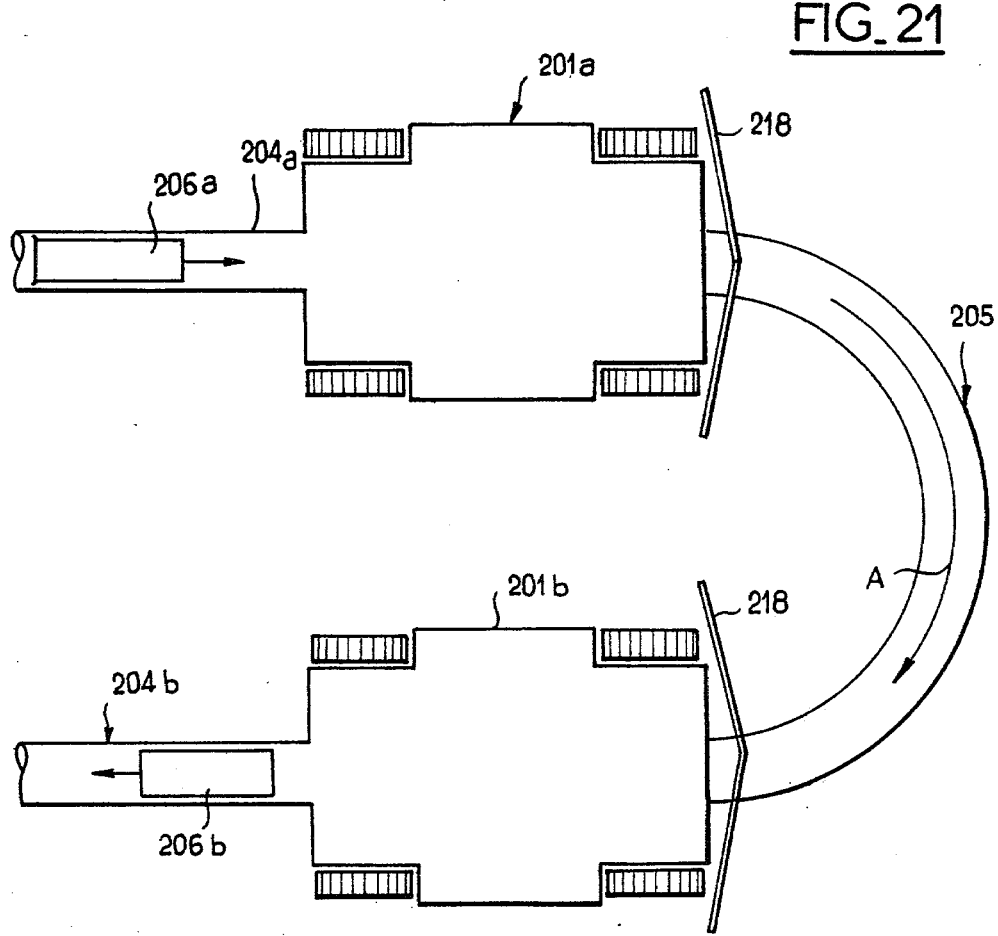

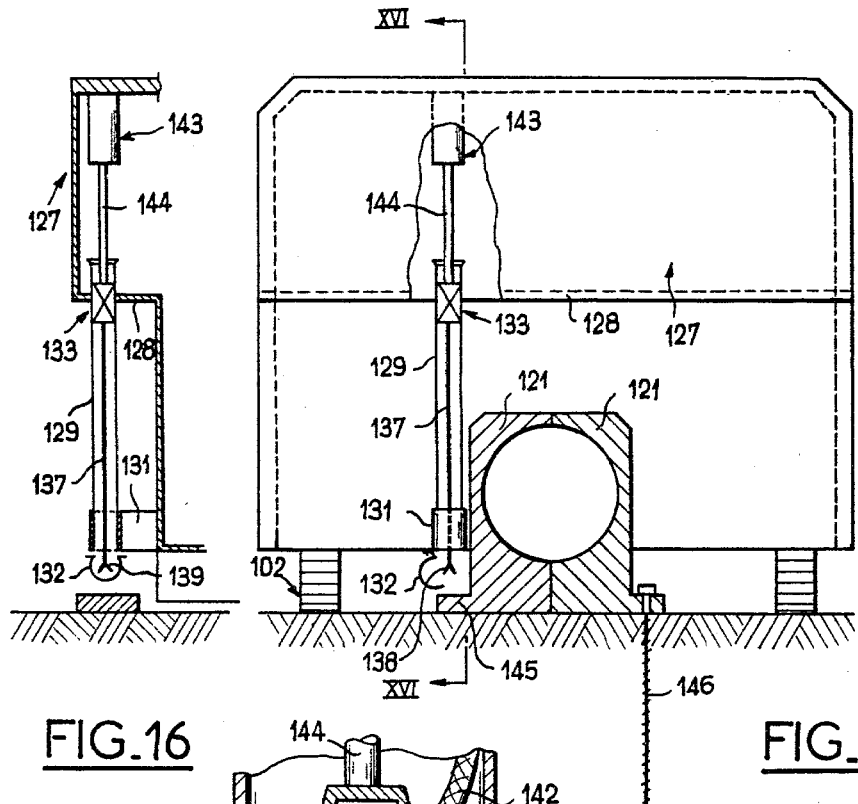
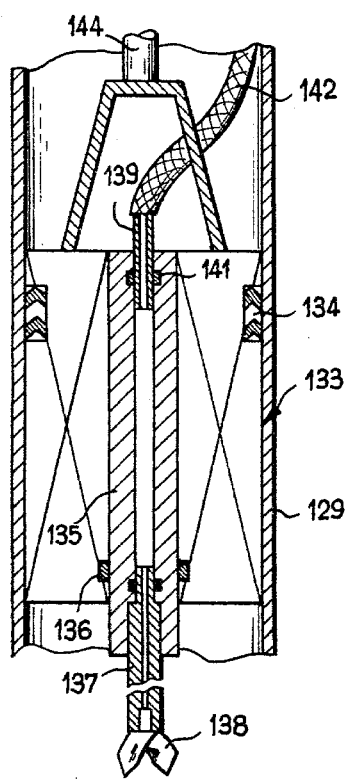
FIG.16　FIG.15　FIG.17

APPARATUS FOR LAYING UNDERWATER PIPELINES

This invention relates to apparatus for constructing and installing underwater pipelines, especially on the sea floor, the pipelines considered being intended to constitute both tunnel galleries and pipes for transportation of liquids or gases.

In particular, the invention finds an application in the field of off-shore installations.

Among the known methods for laying underwater pipelines, one method consists in drawing along the sea bed the front portion of the pipeline which has been suitably lightened and fitted with a skid. The pipeline is constructed on land for example and progressively as it is moving forward. This method is suitable only for ducts of relatively small length which are intended, for example, to pass across a river or a fairly narrow lake.

For constructing and laying subsea pipelines, it is a known practice to assemble the pipe in sections at the surface on board a workshop vessel or pipelaying ship. The pipeline is then lowered and allowed to rest on the sea bottom by making use of floats and a certain degree of traction exerted by the vessel. Steps are taken to ensure that deformation of the pipeline during immersion never exceeds the elastic limit or at least the breaking point of the material constituting the pipeline.

The methods just mentioned are not suitable, however, if the sea floor is rocky or has a rugged relief and prove more difficult to apply in practice as the depth is greater. These methods are also dependent on the state of the sea and, in the majority of instances, they cannot be carried out without danger under weather conditions such as gale-force winds or even moderate storms.

Recourse has been had to a number of expedients, one of which consists in constructing the pipeline in situ within a caisson which is subsequently opened-out on the sea floor. Caissons of this type are usually pressurized, however, and members of construction personnel who work within such caissons are subject to the restrictive conditions of recompression stages when they return to the surface atmosphere.

The aim of this invention is to provide apparatus for the construction and laying of underwater pipelines which enables personnel to work continuously in conditions of complete comfort and especially without being subject to any of the limitations imposed on deep-sea divers.

According to a first aspect of the invention, the apparatus for constructing and installing, especially by means of a pipelaying vessel, underwater pipelines which are connected to at least one point of the coast enables the fabrication in situ of at least one portion of the pipeline within a caisson which rests on the sea bed and travels along the bed in the direction of laying progressively as the pipeline is being assembled, at least one portion of the pipeline being fabricated at the bottom of the sea. The the interior of the caisson is continuously maintained in communication with the atmosphere.

Members of personnel who work within the caisson are not subject to the conditions and requirements of decompression. They consequently have the advantage of frequent periods of rest in free air and working conditions are less arduous than in a diving-bell.

According to a distinctive feature of the invention, the caisson is put into communication with the atmosphere by means of the pipeline which has already been laid.

The advantage of this feature lies in the fact that it dispenses with the need for any ventilation piping between the caisson and an auxiliary vessel. This is a considerable advantage since the possibility of failure of such piping must always be contemplated at sea and is attended by very serious consequences.

In a preferred embodiment of the invention, the pipeline is progressively delivered from the rear end of the caisson relatively to the direction of laying by means of a leaktight opening of said caisson.

The pipeline is virtually extruded from the caisson in a practically continuous manner as the caisson moves forward along the sea bed without calling for any complex laying operation.

In a first form of execution, the pipe is fabricated within the caisson from agglomerate material having a quick-setting binder in which the starting materials are supplied through the pipe which has already been laid.

It is only necessary to supply the caisson with the starting materials of the agglomerate in a regular and uniform manner. The use of the pipe which has already been laid (if this latter has sufficiently large dimensions) permits the supply of materials in a dry form from the coast and dispenses with the need for any delicate and complex handling means between the pipelaying vessel and the caisson.

In a second form of execution, the pipeline is fabricated within the caisson by assembling the constituent plates of said pipeline. Provided that said plates are smaller than one half-shell, they can be supplied from land through the pipe which has already been laid.

In a third form of execution, sections of pipeline supplied from a vessel are assembled in end-to-end relation within the caisson.

Since it is impossible in practice to transfer these sections through the pipe which has already been laid, they must accordingly be lowered from an auxiliary supply vessel which accompanies the caisson into which they are introduced through a lock-chamber.

According to a second aspect of the invention, the device which makes use of an auxiliary vessel for laying pipelines which are submerged at the bottom of the sea and connected to at least one point of the coast, essentially comprises an underwater vehicle provided with means for traveling along the sea bed, means for providing a flexible connection with the vessel, means for fabricating the pipe within the vehicle at least to a partial extent, and means for withdrawing the pipe from the vehicle progressively as it is being fabricated and for placing said pipe on the sea bed.

By means of this vehicle, practically all the work involved in fabrication and laying is carried out at the bottom of the sea and within the vehicle whilst the vessel only plays a very secondary part.

In an advantageous embodiment of the invention, the device comprises means for transportation between the vehicle and that end of the pipeline which is placed on land, said transportation means being housed within the pipe which has already been laid.

This distinctive feature is of particular interest if the pipeline has a large diameter, for example in the case of an intercontinental tunnel. All supplies can reach the vehicle by dry route. The problem of ventilation of the vehicle is considerably simplified. Personnel can also be transported by this route.

In another form of execution of the invention, the device comprises means for preparing a quick-setting agglomerate material and means for injecting said material between two cylinders which define the internal and external walls of the pipe.

This practically continuous fabrication is accompanied by an also practically continuous withdrawal of the pipe from the rear end of the vehicle.

In still another form of execution of the invention, the device comprises within the vehicle handling means for positioning the constituent plates of the pipeline and for assembling said plates in leak-tight manner.

Said plates consist of portions of cylindrical shell which are conveyed from land through the pipeline which has already been laid. By means of this device, the pipeline can be constructed of materials other than an agglomerate and consisting of metal, for example.

In a further form of execution of the invention, the device comprises handling means for lowering a section of prefabricated pipe from the auxiliary vessel to the vehicle and the vehicle comprises a lock-chamber for the introduction of said pipe section into the vehicle.

A device of this type is preferable if the pipe has a relatively large diameter since it can thus be laid more rapidly in spite of the additional handling operations involved.

In a still further form of execution of the invention, the device comprises handling and guiding means for lowering a prefabricated pipe section from the auxiliary vessel to the vehicle, and a second vehicle placed in front of the first in the direction of laying is fitted with mechanical means for thrusting the pipe section into the first vehicle through an opening fitted with sealing means.

In this form of construction, the pipe section does not need to be completely introduced into the vehicle and can be of substantial length. Successive pipe sections pass through the vehicle from one end to the other in the axial direction and work within the vehicle is carried out only on that portion of a pipe section which is adjacent to the seal.

In a preferred embodiment of the invention, the sealing means for withdrawing the pipe from the vehicle or introducing a pipe section into said vehicle comprise two rings of elastic and high-strength material each provided with a selectively inflatable cavity in order to ensure leak-tight cooperation of the ring with the pipe, at least one of said rings being mounted on an annular piston which is capable of sliding longitudinally with respect to the vehicle.

Alternate clamping of the rings against the pipe achieves continuous leak-tightness and the pipe-withdrawal operation is carried out by sliding the non-clamped ring along the pipe.

In a preferred embodiment of the invention, the means for withdrawing the pipe from the vehicle comprise jacks applied on the one hand against a fixed element of the vehicle and on the other hand against a collar fitted with means for clamping against the pipe, synchronization means being provided for displacing said jacks at a speed equal to the speed of forward travel of the vehicle along the sea bed.

The vehicle is intended to stop during the return stroke of the jack unless provision is made for a double system of jacks in which the active or working stroke of one of the systems takes place during the return stroke of the other system.

In a preferred embodiment of the invention, the vehicle propulsion means comprise orientable caterpillar-track units. These caterpillar-track units can advantageously be disassembled for maintenance and emergency repair work, the vehicle being provided with lock-chambers in order to withdraw the caterpillar-track units into the interior of the vehicle.

Preferably, the vehicle is supported on its propulsion means by suspension jacks and the range of travel of said jacks is determined so as to produce upward displacement of the caterpillar-track units into the disassembly lock-chambers.

Said jacks are advantageously designed to permit adjustment of the longitudinal inclination or trim of the vehicle in order to maintain the outlet orifice of the pipe at a substantially constant distance from the sea bed. At the time of relatively abrupt changes of slope in the sea bed, this accordingly prevents high bending stresses from being applied to the pipes and to the sliding seal.

The invention further proposes horizontal jacks for controlling the orientation of the caterpillar-track units in order to produce changes in direction of the vehicle.

The invention also proposes in the case of a particularly abrupt change in either slope or direction to mount the sealing means between the pipe and the vehicle on a knuckle-joint.

In an improved embodiment of the invention, the device comprises two lock-chambers for withdrawing from the vehicle two half-collars on each side of the pipe, means for exerting a thrust on said half-collars in such a manner as to clamp the pipe, and means for anchoring collar-fastening bolts in the sea bed.

At the same time, if it proves necessary to lay the pipeline on the sea bed, the device comprises a lock-chamber for withdrawing a bolster from the vehicle and means for thrusting said bolster beneath said pipeline.

Should it be found necessary on the contrary to bury the pipeline, the device comprises means for cutting a trench in the sea bed and for laying the pipeline within said trench.

In the case just mentioned, the device preferably comprises means for transferring the material excavated from the trench and for depositing said material on the pipeline which has been laid so as to bury this latter.

In a particular embodiment of the invention, in order to construct and instal a twin pipeline, the device comprises a vehicle divided into two twin vehicles, these two vehicles being connected together by means of a U-shaped pipe having its openings on the front faces of the two vehicles.

This arrangement provides a simple solution to the problem of double forward and return circulation of ventilating air.

Further distinctive features and advantages of the invention will become apparent from the detailed description given below, reference being made to the accompanying drawings which are given by way of example and not in any limiting sense, and in which:

FIG. 11 illustrates the operation of the device in the case of a change of direction of the vehicle;

FIG. 12 illustrates the operation of the device in the case of a change in slope of the sea bed;

FIG. 15 is a diagrammatic view of the anchoring device;

FIG. 16 is a sectional view taken along line XVI—XVI of FIG. 15;

FIG. 17 is a detail view to a larger scale and showing a portion of FIGS. 15 and 16;

FIG. 18 is a part-sectional longitudinal view showing the device for cutting a trench and filling-in;

FIG. 19 is a view taken along line XIX—XIX of FIG. 18;

FIG. 20 is a view taken along line XX—XX of FIG. 18;

FIG. 21 is a semi-diagrammatic plan view of the device for laying two twin pipelines.

Figure 1:
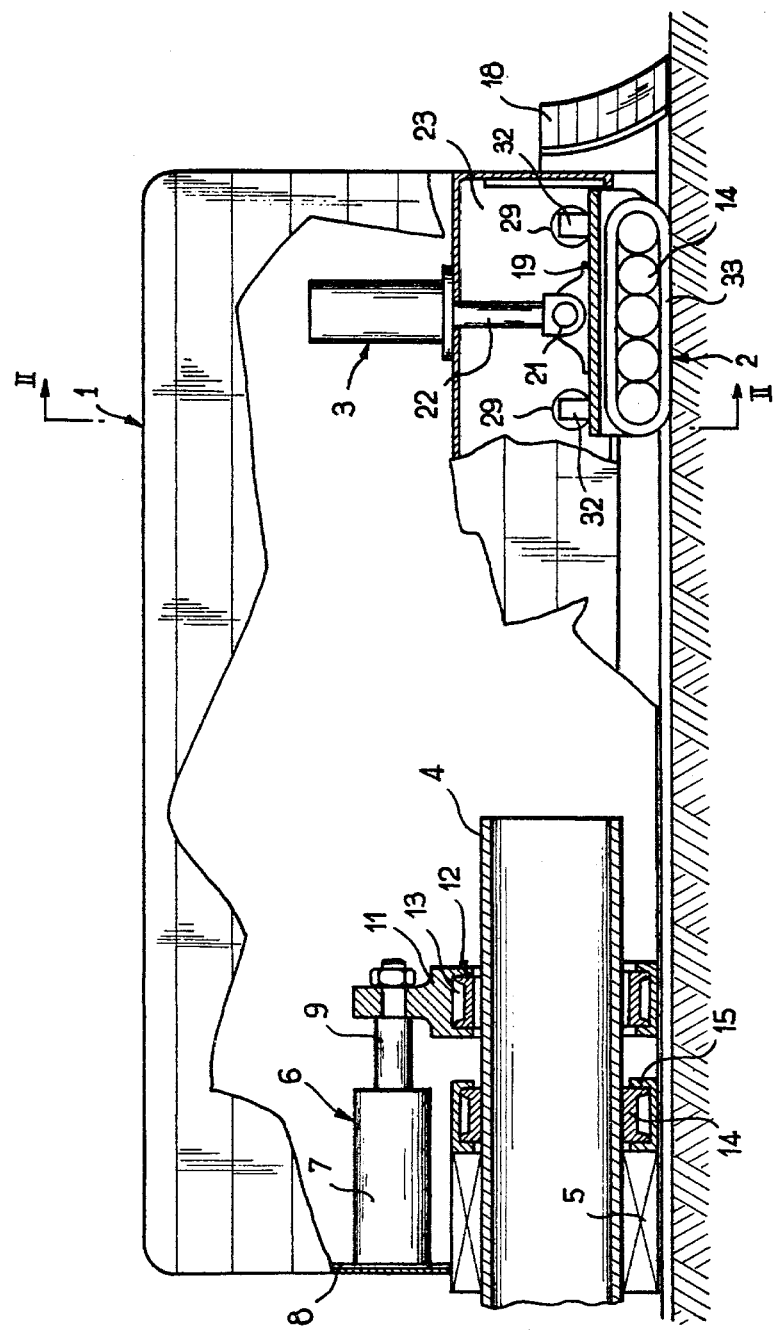
FIG. 1 is a partial longitudinal cutaway view, partly in section, showing a device according to the invention.
Figure 2:
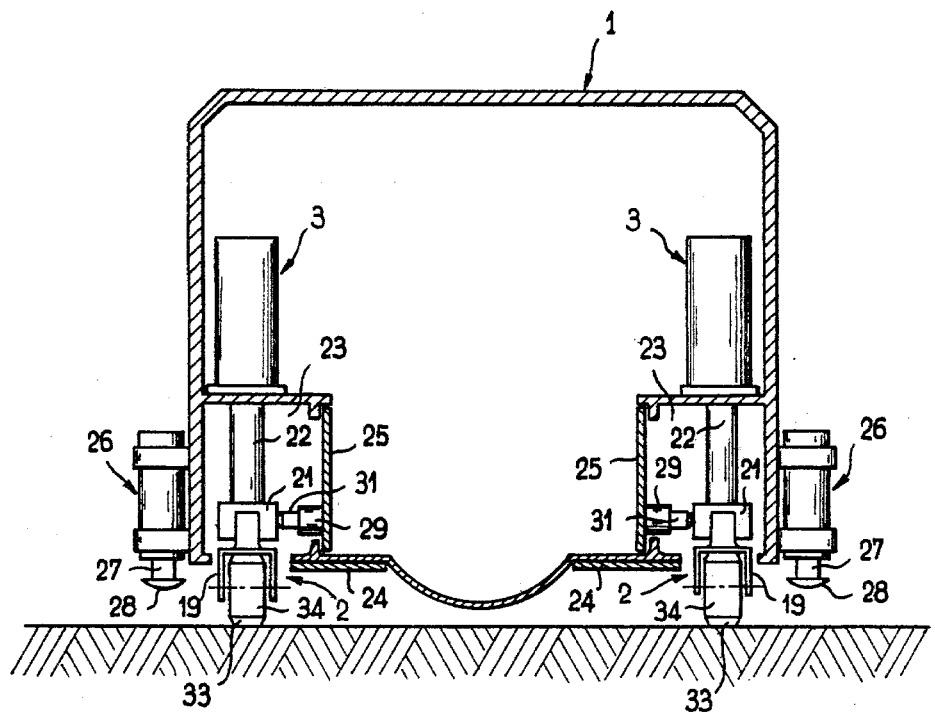
FIG. 2 is a sectional view along line II—II of FIG. 1.
Figure 3:
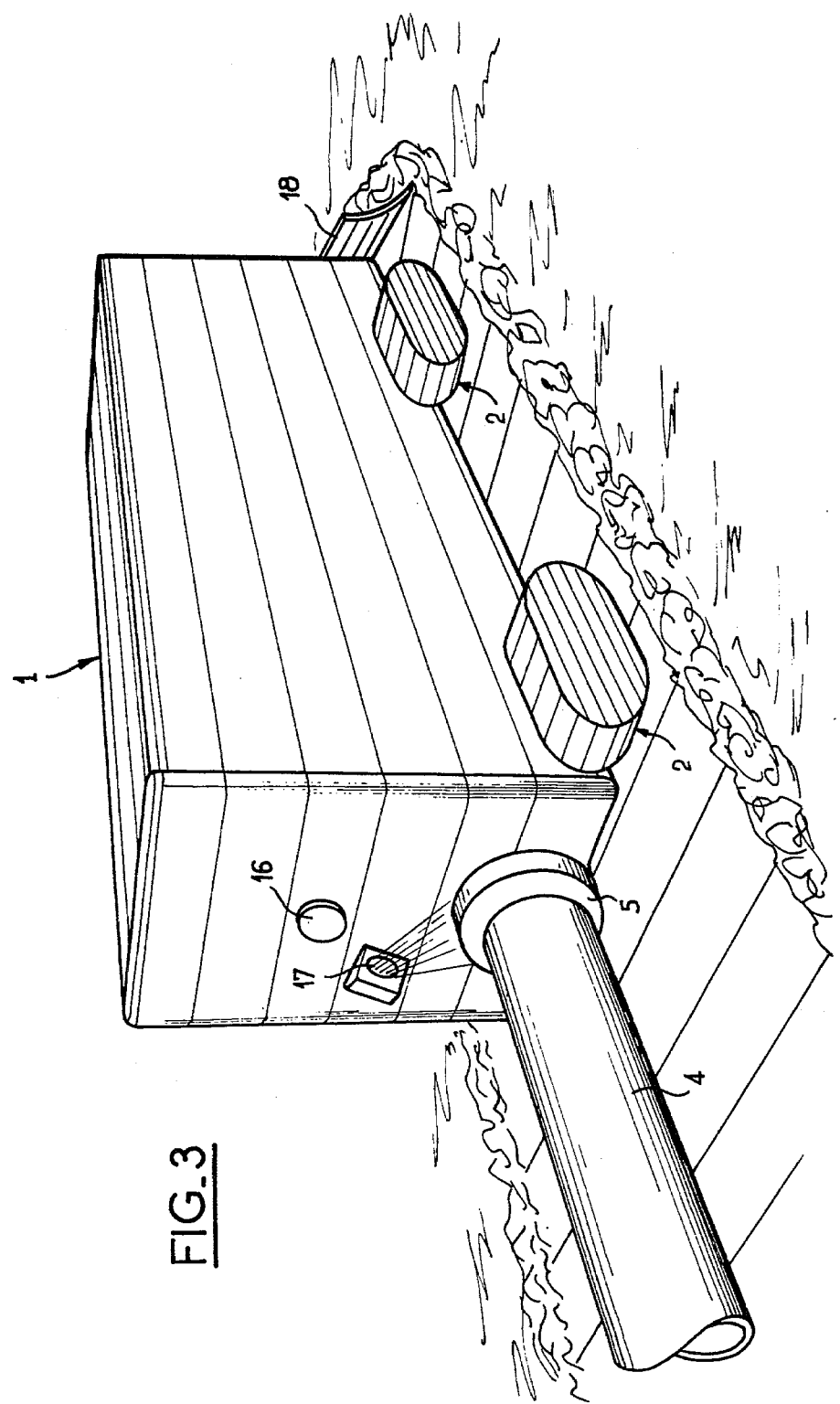
FIG. 3 is a perspective view of a device according to the invention and during operation.

Reference being made to FIGS. 1 to 3, the device according to the invention comprises an underwater vehicle 1 forming a leak-tight compartment supported by four caterpillar-track units 2 by means of suspension jacks 3. The mass of the vehicle is such that this latter rests on the sea bed and has a submergent or specific unit weight of sufficient value to enable said vehicle to travel along the sea bed by means of caterpillar tracks 2.

Means described hereinafter are provided within the interior of the vehicle 1 for constructing a pipe 4 in such a manner as to ensure that said pipeline can be delivered from the rear end of the vehicle 1 through sealing means 5 which will be described in detail hereinafter.

A jack 6 has a body 7 which is rigidly fixed to the rear wall 8 of the underwater vehicle and the jack operating rod 9 is attached to a collar 11, said collar being adapted to carry a ring 12 of elastic and high-strength material which surrounds the pipeline 4. Said ring has a chamber 13 which can be supplied with fluid under pressure through pipes (not shown in the drawings).

A second ring 14 is designed and arranged in the same manner as the ring 12 but housed within a collar 15 which is stationarily fixed with respect to the vehicle.

It is apparent that, under the action of the fluid under pressure, the rings 12 and 14 are capable of either clamping the pipe 4 or of sliding freely on this latter as and when the need arises. By clamping the ring 12 and by allowing the ring 14 to slide freely, displacement of the operating rod 9 of the jack 6 towards the rear end of the vehicle causes outward displacement of the pipeline 4. The forward return of the operating rod is produced by reversing the respective clamping action of the rings 12 and 14. Outward delivery of the pipeline 4 can be made continuous by duplicating the device herein described.

The vehicle 1 further comprises a certain number of porthole-type windows such as the window 16 and a certain number of spotlights of the type designated by the reference 17, said spotlights being oriented in different directions in order to illuminate both the sea bed in the direction of travel and the pipeline 4 which is being laid. The vehicle 1 is also provided at the front end with a plowshare 18 in order to carry out at least a rough surface leveling of the sea bed on which said vehicle is intended to travel.

Each caterpillar-track unit 2 comprises a frame 19 pivotally mounted by means of a yoke 21 on the end of the operating rod 22 of each suspension jack 3 in order to permit a longitudinal movement of oscillation of the caterpillar track which is thus permitted to follow the surface irregularities of the sea bed. Each caterpillar-track unit can be withdrawn into a lock-chamber 23 fitted with doors 24 and 25 by means of the jack 3. A jack 26 attached to the exterior of the vehicle 1 has a vertical operating rod 27, provision being made at the end of said rod for a base 28 which is intended to rest on the sea bed in the event of upward withdrawal of the caterpillar-track unit 2 into the lock-chamber 23.

Two jacks 29 are mounted on the door 25 of the lock-chamber 23, the operating rods 31 of said jacks being directed horizontally and intended to cooperate with stops 32 rigidly fixed to the frame 19 with a view to initiating rotational displacement of the caterpillar-track unit 2 in order to carry out changes of direction. To this end, the operating rod 22 is endowed with freedom of rotation within the jack 3.

Finally, the unit 2 comprises a caterpillar track 33 which is adapted to engage with rollers 34, at least one roller being driven by a rotary hydraulic motor (not shown in the drawings). Said motor is connected to a central hydraulic-fluid station of known type (not shown) located within the interior of the vehicle 1, by means of flexible pipes passed inside the operating rod 22 which is of hollow design for this purpose.

The central station aforementioned supplies hydraulic fluid not only to the four track units 2 but also to all the jacks mentioned thus far as well as those which will be mentioned hereinafter.

Figure 4:
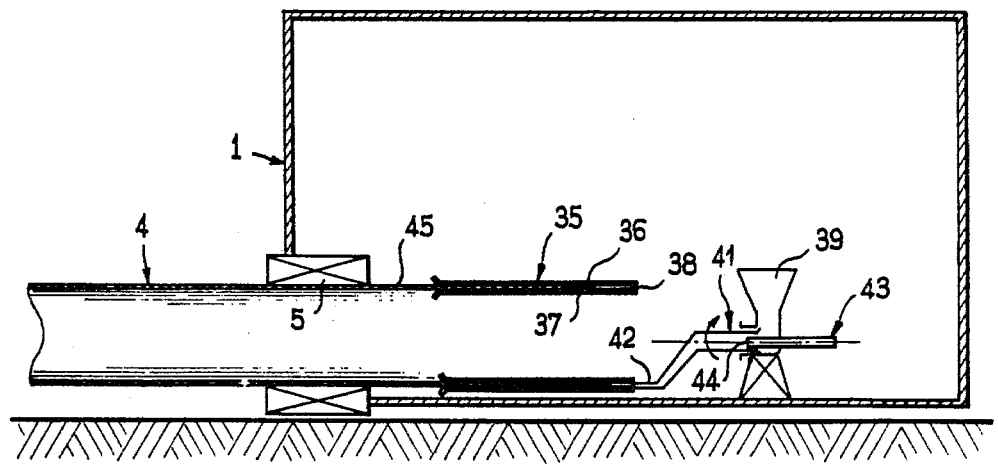
FIG. 4 is a semi-diagrammatic sectional view of a first embodiment of the invention.

Referring to FIG. 4, there will now be described a first embodiment of the means for fabricating the pipeline 4 within the interior of the vehicle 1. Since these means are of known design, this figure is diagrammatic and should be considered as complementary to FIG. 1 although separate from this latter for the sake of enhanced clarity.

A shuttering element 35 made up of two concentric cylinders 36, 37 joined together by means of distance-pieces 38 is fixed in the vehicle 1 by means of supports (not shown). A hopper 39 is provided at the lower end with a pipe 41 rotatably mounted on said hopper and elbowed in such a manner as to ensure that the orifice 42 of said pipe has its opening between the cylinders 36 and 37. A pipe 43 terminating in an injection nozzle 44 passes into the base of the hopper 39 and opens into the pipe 41.

During operation, the hopper 39 is filled with dry materials which are intended to constitute an agglomerate by addition of water and comprise a quicksetting binder or an agglomerate formed by using a plastic resin as binder.

Compressed air injected through the pipe 43 and the nozzle 44 serves to drive the agglomerate through the pipe 41 into the shuttering element 35 in which the pipeline 4 is being formed. The water for wetting the agglomerate or the resin setting accelerator is introduced at the level of the orifice 42. The pipeline thus formed is delivered from the vehicle 1 through the sealing means 5 by means of the system of jacks described earlier.

A certain distance is provided between the shuttering element 35 and the point of delivery of the pipeline 4 in order to form a visible portion 45 of the completed pipeline both for inspection purposes and also for coating if necessary.

In the example herein described, setting of the agglomerate requires about two minutes whilst the rate of delivery of the pipeline 4 is approximately one meter per minute and the length of the shuttering element 35 is approximately two meters.

Figure 5:
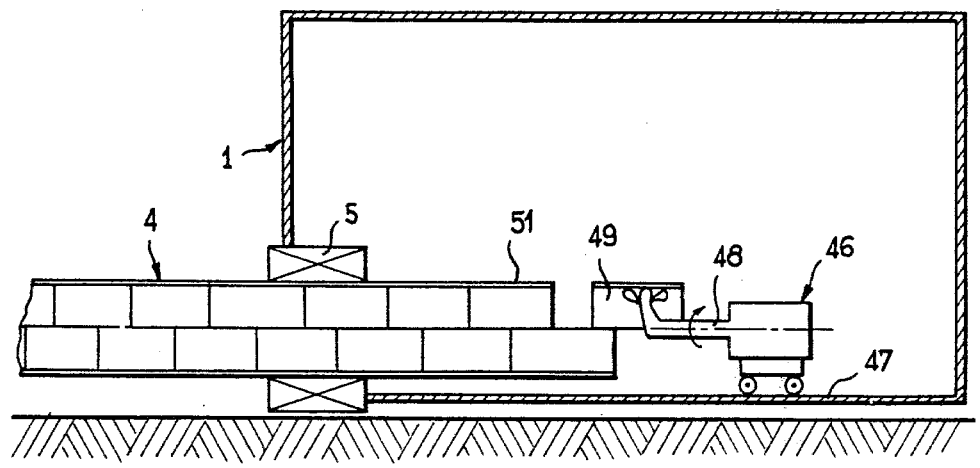
FIG. 5 is a semi-diagrammatic sectional view of a second embodiment of the invention.

There will now be described with reference to FIG. 5 a second embodiment of the means for constructing the pipeline 4. FIG. 5 is presented diagrammatically in the same manner as FIG. 4 and for the same reasons.

A handling carriage 46 is capable of displacement along a runway 47 and provided with a pivotally mounted grappling arm 48. This device makes it possible to take cylindrical shell elements or segments 49 one by one from a stock (not shown) and to place them in position at the end of the pipeline 4 under construction for subsequent assembly.

Final and leak-tight fixation of the segments takes place in an open zone 51.

This device makes it possible in particular to construct metal pipelines by welding or bolting.

In the two methods of construction which have just been described, the invention permits the supply of construction elements, that is to say the materials of the agglomerate or the segments, through the pipeline 4 which has already been laid and starting from that end of said pipeline which is located on land or on an artificial island. Special containers are employed for this purpose or, alternatively, trucks mounted on rails can be employed if the pipeline is of sufficient width.

Figure 6:
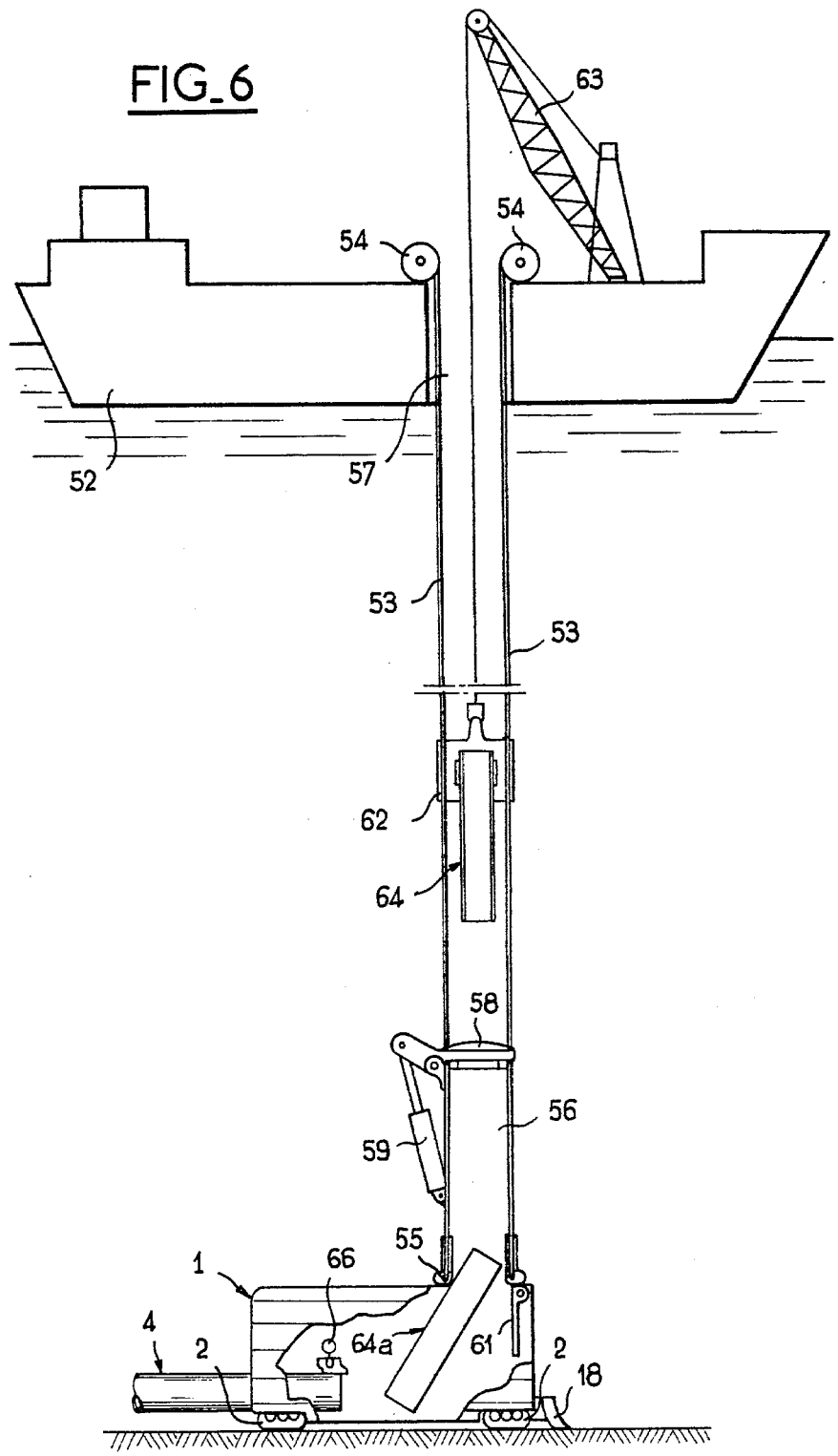
FIG. 6 is a semi-diagrammatic sectional view of a third embodiment of the invention.

There will now be described with reference to FIG. 6 a third embodiment of the means for constructing the pipeline 4.

In this embodiment, the vehicle 1 is accompanied by an auxiliary vessel 52 and attached thereto by means of four flexible cables 53 which form a cage. The length of these cables is adjusted automatically according to the variations in depth and in slight drift of the vessel by means of winches 54 mounted on board the vessel.

The cables 53 are fixed on a collar 55 which is tightly fitted on a shaft 56 of the vehicle 1 forming a lock-chamber and located opposite to a shaft 57 formed in known manner within the vessel 52. The lock-chamber 56 comprises an outer door 58 which can be operated by a jack 59 and an inner door 61.

An elevator 62 suspended from a crane 63 on board of the vessel is guided by the cables 53 and adapted to carry a prefabricated pipeline section 64.

During operation, a section 64 stored on board the vessel is moved downwards by the crane 63 and the elevator 62 to the lock-chamber 56. As a result of operation of the lock-chamber, said section is introduced into the vehicle 1 at 64a in which an operator 66 places said section in abutting contact with the pipeline 4 which has already been placed in position.

This mode of procedure preferably applies to pipelines of relatively small diameter which would not readily permit of supply through the pipeline which has been laid. This procedure permits relatively fast and simple construction at the level of the vehicle but would not be suited to the construction of large-diameter pipelines by reason of the large dimensions which would in that case be necessary for the lock-chamber 56.

It will be noted that the device permits a certain degree of freedom of the vessel with respect to the vehicle by reason of the flexible connections which are provided. Precise anchoring of the auxiliary vessel is therefore unnecessary.

Figure 7:
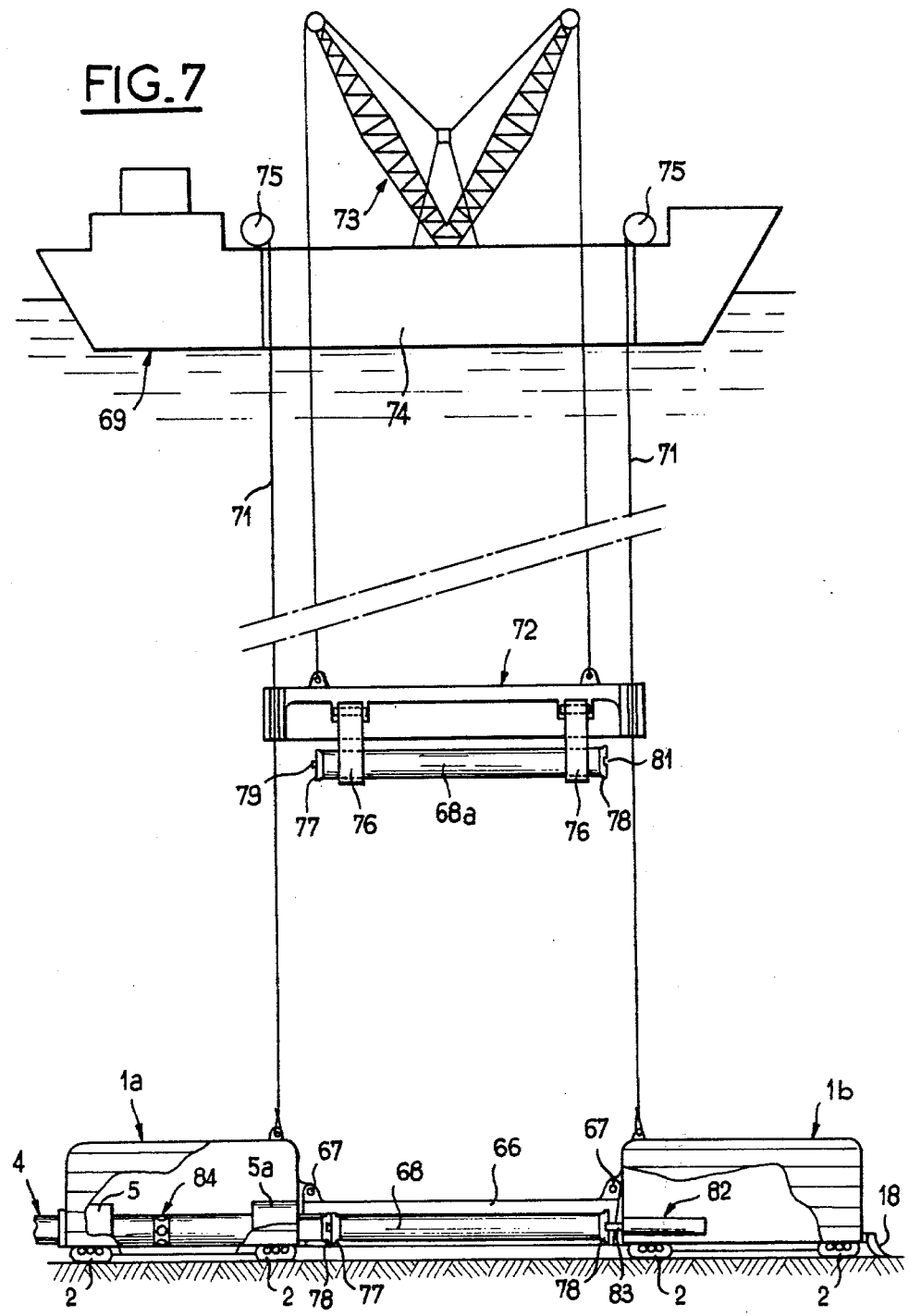
FIG. 7 is a semi-diagrammatic sectional view of a fourth embodiment of the invention.

There will now be described with reference to FIGS. 7 and 8 a fourth embodiment of the means for constructing the pipeline 4.

In this embodiment, the vehicle 1 is divided into a rear vehicle 1a and a front vehicle 1b (in the direction of laying). These vehicles are similar to the vehicle 1 described earlier except for the fact that the vehicle 1b which does not contain either the pipeline 4 or a section of said pipeline at any time is not provided with corresponding sealing means and with construction means proper. Said pipeline is provided with its own propulsion means and with operating means which will be described hereinafter.

On the other hand, the vehicle 1a comprises sealing means 5a both at the front and at the rear, with the result that the pipeline 4 can pass right through said vehicle.

The vehicles 1a and 1b are joined together by means of a cradle 66 pivotally mounted on pins 67 and located at a level such that a pipeline section 68 which rests on said cradle is located in the line of extension of the pipeline 4 which has already been laid. The hollow cradle 66 provides all communications between the vehicles 1a and 1b, especially the supply of fresh air to the vehicle 1b.

Each vehicle 1a and 1b is connected to an auxiliary vessel 69 by means of two cables 71 so as to form a four-cable guiding cage for an elevator 72 suspended from a double-boom crane 73 which is located on board the vessel.

The vessel 69 is provided with a shaft 74 for the elevator 72 and the cables 71 are connected to respective winches 75 for adapting the cable lengths to the depth of the sea floor. These winches exert a constant tension which is dependent both on the weight of the cable and on the need to ensure correct guiding of the elevator 72.

The elevator 72 is provided with hooks 76 for supporting a prefabricated pipeline section 68a. The length of said hooks is relatively substantial under normal conditions of use of the device and may exceed the length of the vehicles 1a and 1b. Said section is fitted with plugs 77, 78; one plug such as the rear plug 77 (as considered in the direction of laying) is provided with a stud 79 whereas the other plug has a bore 81 which is adapted to receive a stud such as the stud 79.

Finally, the vehicle 1b is provided at the rear end with a jack 82 disposed along the longitudinal axis of the vehicle, the dimensions of the operating rod 83 of said jack being such that said rod can be freely inserted into the bore 81 of the plug 78.

In order to utilize the device, a prefabricated section 68a fitted with its plugs 77 and 78 are lowered from the vessel by means of the elevator 72 and placed in the cradle 66 in position 68 or in other words in line with the pipeline 4 which has already been laid.

Figure 8:
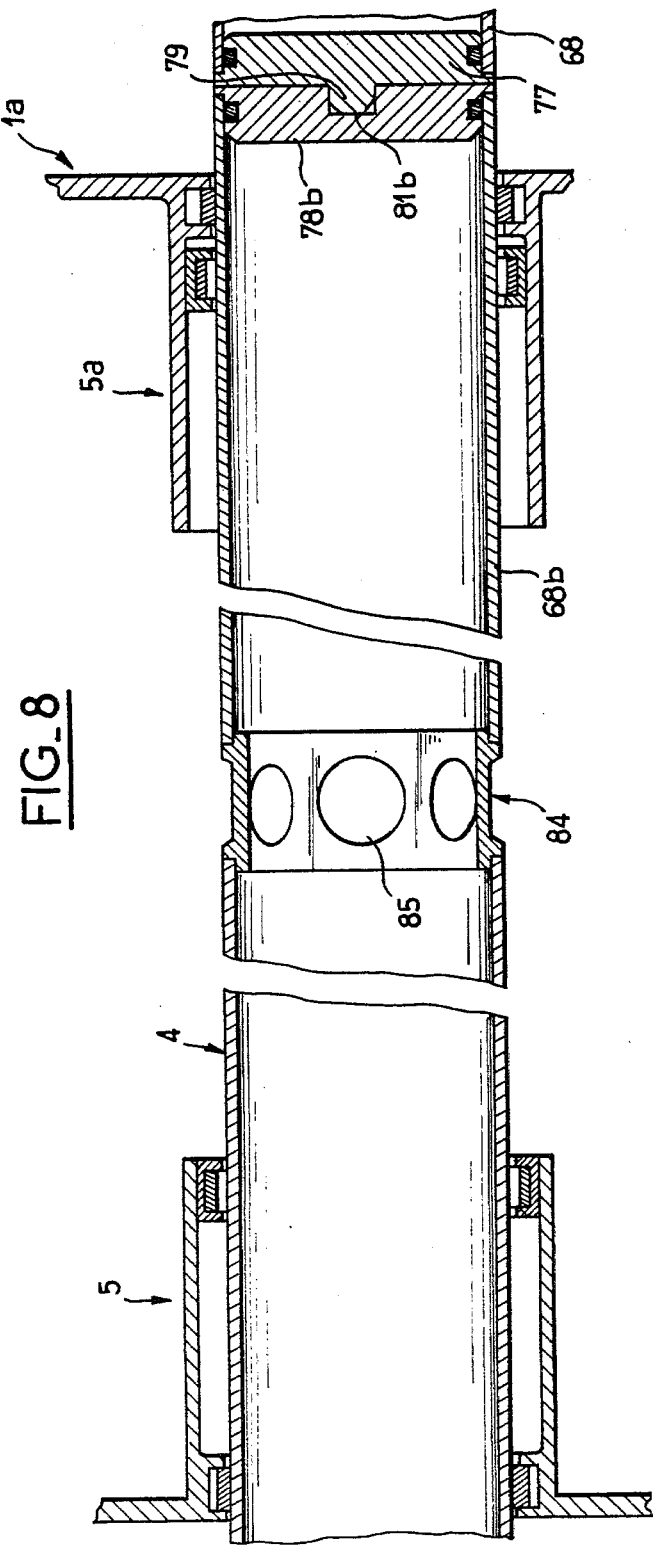
FIG. 8 is a detail to a larger scale and showing the embodiment of FIG. 7.

The jack 82 is then operated so as to exert a thrust on the section 68 until this latter comes into contact with a section 68b which has previously been introduced into the vehicle 1a by means of the operation now described (with reference to FIG. 8). During this operation, accurate alignment of the sections 68 and 68b is ensured by cooperation of the stud 79 with the bore 81b.

The thrust of the jack 82 is continued in order to engage the greater part of the pipeline section 68 within the vehicle 1a, an equivalent length of the pipeline 4 being delivered from the vehicle through the rear sealing means 5. Once the cradle 66 has been released, the operation is begun once again.

As soon as the pair of plugs 77 and 78b has entered the vehicle 1a (as shown in FIG. 8), these two plugs are withdrawn and replaced by an intermediate section 84 pierced by orifices 85 for ventilation of the vehicle through the pipeline 4. It is only at this moment that the section 84 will pass through the rear sealing means 5 which are withdrawn in order to make a final connection between the pipeline sections which had been previously separated by said intermediate section.

Again in this instant, there is no need whatever to ensure accurate positioning of the vessel with respect to the underwater vehicles.

This form of construction which is heavier and more complex than in the previous embodiment makes it possible to increase the laying speed by making use of prefabricated sections of substantial length.

Figure 9:
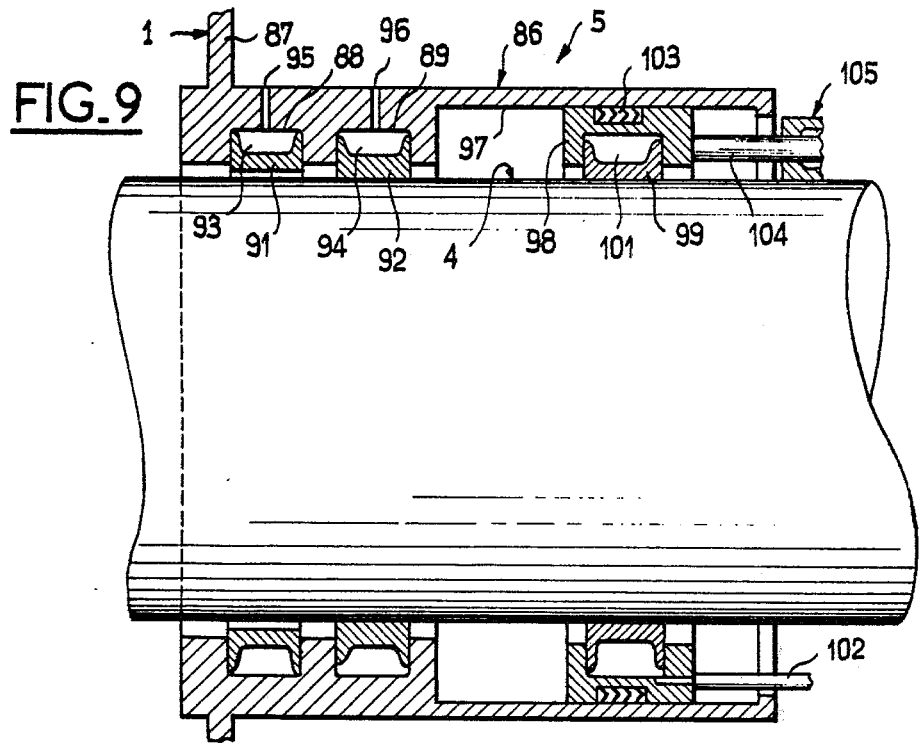
FIG. 9 is a detail view of a first embodiment of the sealing means.
Figure 10:
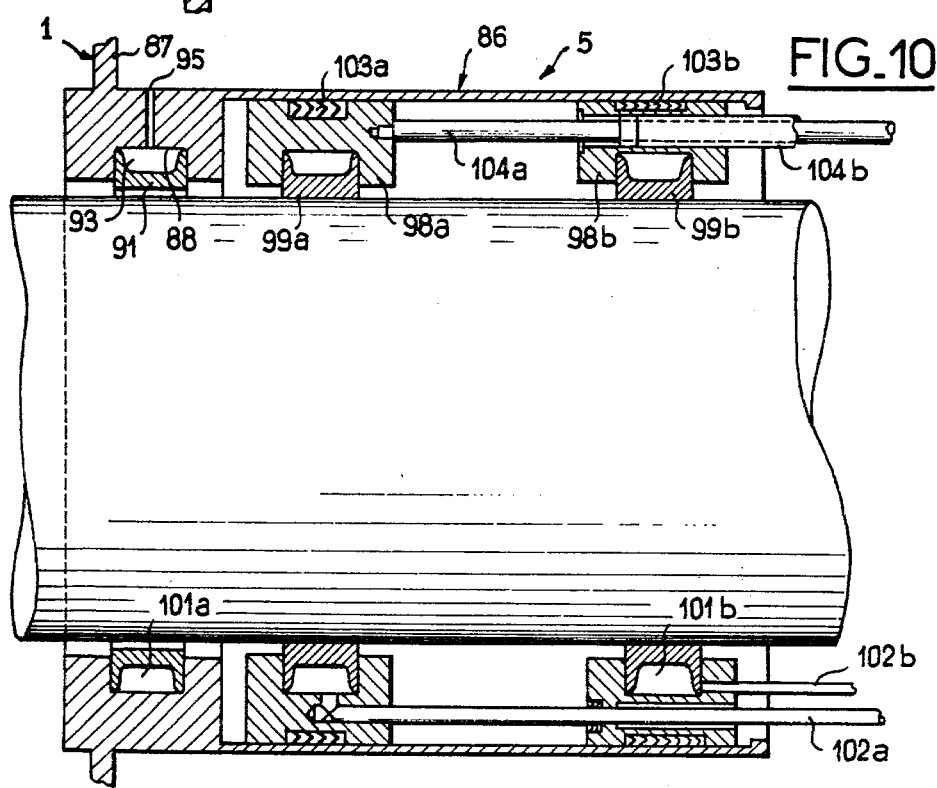
FIG. 10 is a detail of a second embodiment of the sealing means.

Referring to FIGS. 9 and 10, there will now be described in detail the sealing means 5 which have been mentioned above.

In a first embodiment illustrated in FIG. 9, a tube 86 is rigidly fixed to the rear wall 87 of the vehicle 1 or is integral with this latter. Two rings 91 and 92 having a U-section at their periphery and formed of elastic and high-strength material are inserted in two channels 88 and 89 formed in the inner wall of said tube 86 so as to constitute cavities 93 and 94 in conjunction with the respective channels. Said cavities are connected by means of ducts 95 and 96 to the central hydraulic-fluid station (not shown) which was mentioned earlier.

The dimensions of the rings 91 and 92 are such that, when the corresponding cavities are not subjected to any hydraulic fluid pressure, their internal diameter is slightly larger than that of the coaxial pipeline 4. The pipeline is therefore capable of sliding freely within said rings as shown in the case of the ring 91. On the contrary, if a pressure is applied within the cavity, the corresponding ring is applied in leak-tight manner against the pipeline 4 as shown in the case of the ring 92.

There is formed within the tube near the end opposite to the wall 87 an annular chamber 97 in which is slidably fitted an annular piston 98. A ring 99 which is similar to those mentioned earlier is inserted in said piston and forms a cavity 101 which is connected to the source of hydraulic fluid under pressure by means of a flexible pipe 102.

A packing-ring 103 of known type is provided between the piston 98 and the annular chamber 97 in order to withstand the water pressure at the bottom of the sea.

Finally, the operating rod 104 of a jack 105 is attached to the piston 98 in such a manner as to produce a displacement of said piston in coaxial relation with the tube 86.

During operation, since the ring 92 is locked in position on the pipeline 4 and the ring 99 is released, the piston 98 is moved back to its right-hand end position by means of the jack 105. The locking positions of the two rings aforesaid are then reversed. Under the action of the jack 6 (shown in FIG. 1), and since the rings 12 and 14 are respectively locked and released, the pipeline 4 is delivered from the vehicle whilst leak-tightness is ensured by means of the ring 99 and the packing-ring 103.

At the end of travel of the piston 98 towards the left, locking of the rings is reversed and the process is resumed.

The ring 91 does not play any part in the operation and serves only to ensure leak-tightness in the event of outage of the device for maintenance purposes.

A second embodiment of the sealing means 5 will now be described with reference to FIG. 10. These means further comprise a ring 91 which is mounted in the same manner as hereinabove described and performs the same function.

In this instance, however, two pistons 98a and 98b are slidably mounted within the annular chamber 17 and are connected respectively to rods 104a and 104b, said rods being mounted in concentric relation with a double jack (not shown in the drawings) which is capable of moving the two pistons simultaneously in opposite directions.

The cavities 101a and 101b formed by the rings 99a and 99b are connected alternately to the source of hydraulic fluid under pressure through the pipes 102a and 102b.

It is apparent that alternate locking of the rings 99a and 99b combined with the simultaneous motion of the pistons 98a and 98b in opposite directions permits continuous delivery of the pipeline 4 since there is always one piston which accompanies the pipeline whilst the other piston returns to its initial position.

There will now be described with reference to FIG. 11 a particular application of the method and the device in the event that the pipeline 4 is intended to describe a curve on a substantially horizontal sea bed.

In order to ensure a curved path of travel of the vehicle 1, action is produced differentially on the direction jacks 29 in order to modify the orientation of the caterpillar-track units 2 (at least the front track units) which rotate about axes defined by the operating rods 22 of the suspension jacks 3.

In order to ensure that the pipeline assumes the desired curvature, it is possible to employ curved prefabricated sections, to introduce wedges between sections, or to vary the orientation of the construction shuttering element.

If the radius of curvature is of substantial length, the sealing means 5 as described earlier may prove suitable for the purpose if the elasticity of the rings alone offers a sufficient degree of freedom. Otherwise, provision is made in accordance with the invention to mount the assembly described with reference to FIGS. 9 and 10 on a knuckle-joint bearing 106 housed within a cage 107 which is secured to the vehicle 1 with interposition of a knuckle-joint seal 108.

In the event of a change of slope (as shown in FIG. 12), suspension jacks 3 are employed for modifying the longitudinal inclination of the vehicle 1 in such a manner as to ensure that the sealing means 5 remain at a substantially constant distance from the sea bed, thus preventing any fatigue of the pipeline 4 if the change of slope is relatively slow. Should this not be the case, it is preferable to mount said sealing means on a knuckle-joint bearing as indicated earlier.

Figure 13:
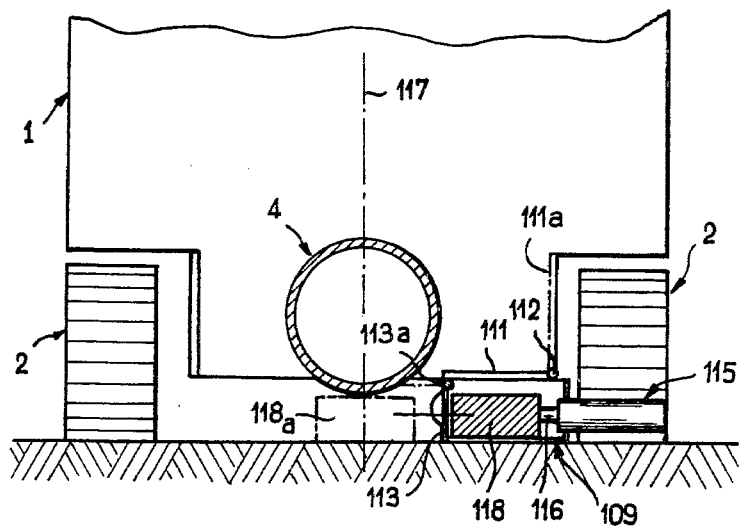
FIG. 13 is a diagrammatic view of the device for laying bolsters.

Referring to FIG. 13, there will now be described a particular device for placing bolsters beneath the pipeline 4 which is assumed to have a positive submerged specific or unit weight.

There is placed at the rear end of the vehicle 1 and in the bottom portion which is located very close to the sea bed a lock-chamber 109 fitted with a door 111 pivotally mounted at 112 and adapted to open towards the interior of the vehicle and with a door 113 pivotally mounted at 114 and adapted to open towards the water. A jack 115 is fixed on one wall of the lock-chamber into which the operating rod 116 of said jack penetrates, the travel of said rod being oriented towards the longitudinal central plane 117 of the vehicle 1.

In order to lay a bolster 118, said bolster is introduced into the lock-chamber 109 by opening the door 111 at 111a. After re-closing said door and opening the door 113 at 113a, the jack 115 is actuated in order to thrust the bolster 118 beneath the pipeline 4 at 118a.

Should the pipeline 4 have a negative submerged specific weight and thus have a tendency to leave the sea bed, the vehicle 1 is provided with means for fastening a collar on said pipeline, said collar being intended to be anchored in the sea bed.

Figure 14:
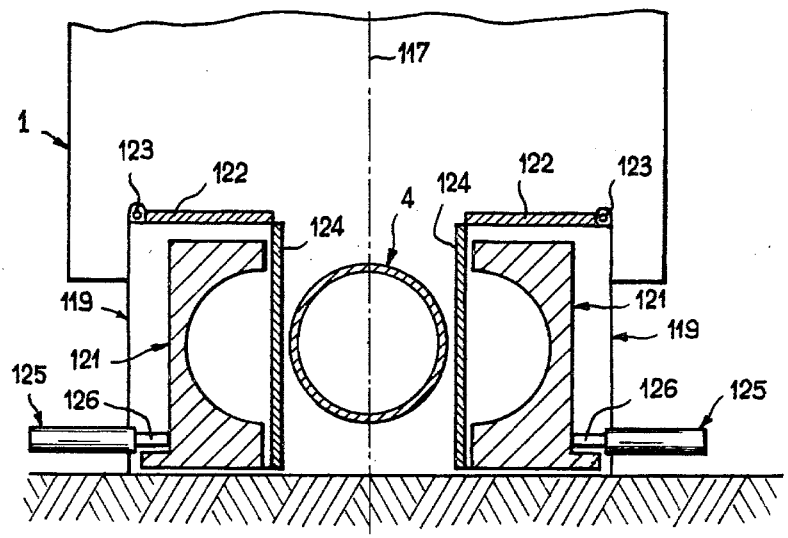
FIG. 14 is a diagrammatic view of the device for fitting collars.

As shown in FIG. 14, said means comprise two lock-chambers 119 located at the rear end of the vehicle at the level of the pipeline 4 and adapted to contain two half-collars 121. Each lock-chamber is provided with a door 122 pivotally mounted at 123 and adapted to open towards the interior of the vehicle and a sliding door 124 adapted to open towards the water.

There is fixed on each lock-chamber a jack 125, the stroke of the operating rod 126 of said jack being directed towards the mid-plane 117 of the vehicle.

The half-collars 121 are fitted in position substantially in the same manner as the bolsters 118. When the half-collars have been introduced into the lock-chambers and the doors 124 have been opened, they are thrust around the pipeline 4 by means of the jacks 125.

Anchoring of the collars in the sea bed is then carried out by means which will be described hereinafter with reference to FIGS. 15 to 17.

At the rear end of the vehicle 1, the body of said vehicle is provided with a projecting portion 127 (as shown in FIGS. 15 and 16) having a re-entrant flat face 128 traversed by a vertical tube 129 maintained at the lower end by means of a collar 131. A valve 132 remote-controlled by contral means (not shown) serves to close the tube 129.

Within the tube 129 is slidably mounted an electrically operated motor unit 133 (as shown in FIG. 17) fitted with seals 134 which are sufficient to prevent any penetration of water when the valve 132 is open.

The motor unit 133 is of known type and serves to drive in rotation an axial mandrel 135 which cooperates with the unit by means of a leak-tight rotary seal 136. Within the mandrel 135 is inserted a hollow boring rod 137 which carries a tool 138.

A nozzle 139 is fixed at the other end of the mandrel 135 with interposition of a rotary seal 140, said nozzle being connected to a flexible pipe 142 for the removal of drill cuttings.

A telescopic jack 143 attached to the roof of the vehicle 1 has an operating rod 144 which is connected to the motor unit 133 in order to lift or lower said rod within the tube 129.

In order to employ the device, the valve 132 is opened and the motor unit 133 is lowered and started-up at the same time. The tool 138 carried by the rod 137 first drills a hole in a flange 145 of the half-collar 121, then in the sea bed, the drill cuttings being discharged under the pressure of the water through the hollow rod 137 and the pipe 142.

On completion of the boring operation, the motor unit 133 is displaced upwards until the valve 132 can be closed, whereupon the unit is completely removed from the tube 129 and the drilling rod 137 is replaced by an anchoring bolt; the operation is then begun again in order to fix the bolt at 146 by known means.

As can readily be understood, the device hereinabove described is doubled on each side of the pipeline in order to permit anchoring of each side.

There will now be described with reference to FIGS. 18 to 20 a particular embodiment of the invention for laying buried pipelines.

Figures 18, 19, 20:
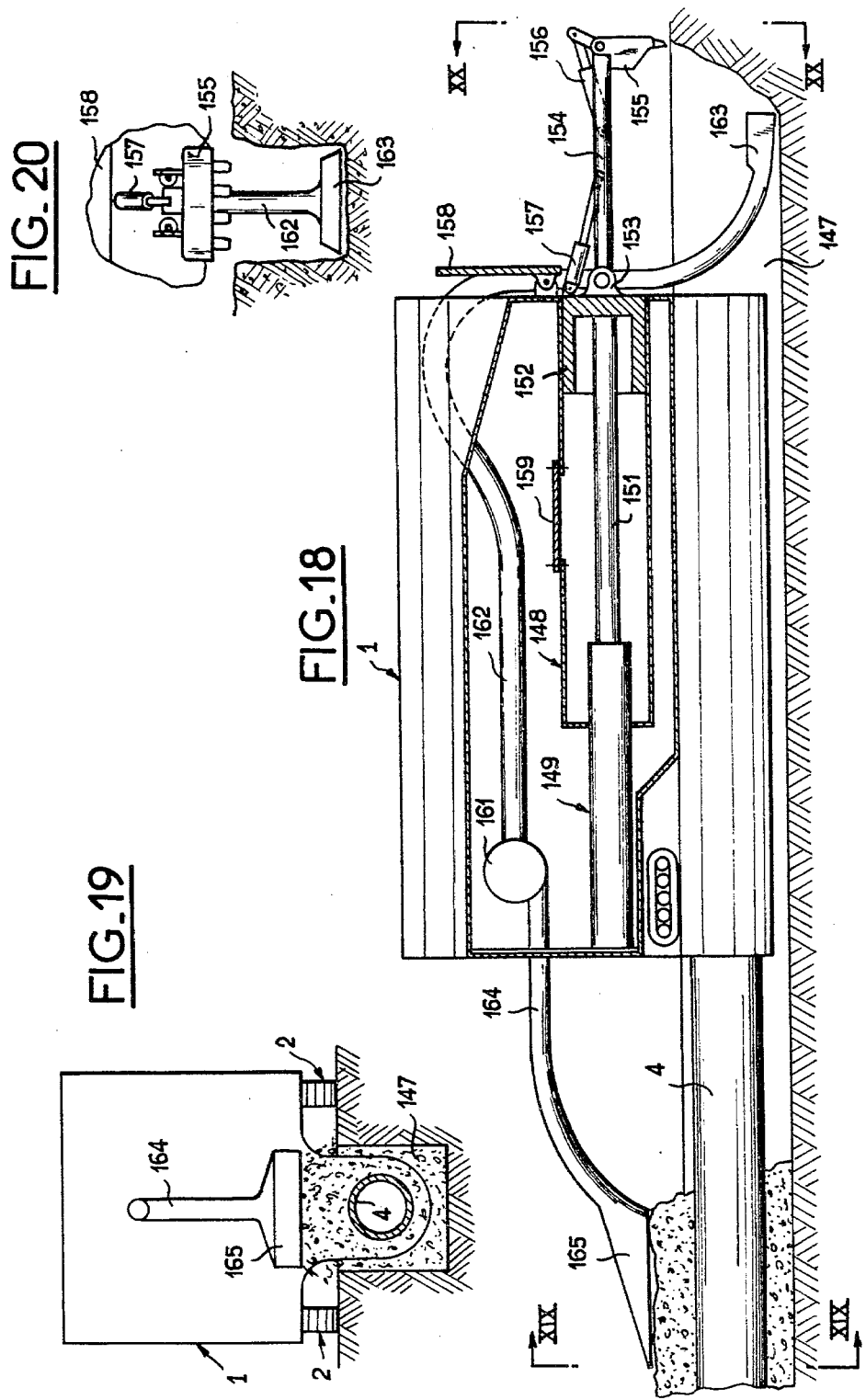

In this embodiment, the means for constructing and withdrawing the pipeline from the vehicle are underslung with respect to the vehicle (as shown in FIG. 19) so as to ensure that the pipeline 4 is withdrawn at the level of a trench 147.

A tube 148 is fixed at the front end of the vehicle 1 and closed in leak-tight manner on the body of a coaxial jack 149 which is attached to the rear wall of the vehicle.

The operating rod 151 of the jack 149 is provided at its extremity with a slider 152 which is capable of sliding with a certain play within the cylinder 148. The slider 152 is provided with a yoke 153 on which is pivotally mounted an arm 154 carrying an articulated shovel 155. The shovel 155 can be remote-controlled by a jack 156 whilst the arm 154 can be remote-controlled by a jack 157.

Within the perimeter of the tube 148, the front wall of the vehicle has an opening which can be sealed-off by means of an articulated door 158. Within the vehicle, the tube 148 is provided with a leak-tight inspection door 159. It will be understood that the tube 148 forms a lock-chamber.

A suction pump 161 is connected through a pipe 162 to a collecting spout 163 located at the bottom of the trench 147 which is cut by the shovel 155 and, through a pipe 164 to a distribution hopper 165 which opens at the rear end of the vehicle above the trench.

During operation, the shovel 155 cuts the trench in front of the vehicle as a result of the action produced by the jacks 156 and 157 and the cuttings are collected by the hopper 163 and the pump 161 to be discharged by the hopper 165 onto the pipeline 4 which is thus buried.

In order to supervise and to maintain the shoveling device, the assembly is withdrawn into the tube 148 by means of the jack 149 and the door 158 is then closed. After emptying the tube 148, the inspection door 159 is opened.

Referring to FIG. 21, there will now be described a particular embodiment of the device for laying two twin pipelines 204a and 204b.

The device comprises two vehicles 201a and 201b which are substantially identical and each carry a plowshare 218. The vehicles are caused to move at the same speed by control means (not shown) and are each intended to lay one pipeline independently of each other.

A semi-circular pipe 205 provides a continuous connection between the vehicles at the front end.

By means of this device, containers 206a supplied from the inlet of the pipe 204a located on land can be conveyed in one direction up to the vehicle 201a and can be collected on land at 206b through the pipe 204b after being conveyed through the pipe 205.

Similarly, ventilation of the vehicles is considerably simplified by the possibility of one-way supply. Fresh air is admitted through the pipe 204a and stale air is discharged through the pipe 204b in the direction of the arrow A.

In all the embodiments hereinabove described, the invention makes it possible to maintain the interior of vehicles at atmospheric pressure, thereby eliminating problems of decompression and permitting rapid rotation of personnel. In the majority of applications and especially when laying large pipelines, all transportation both of men and equipment can be carried out by dry-route without any need to employ a lock-chamber. Finally, an auxiliary vessel is essential only in certain alternative embodiments in which the use of this vessel is simplified with respect to known techniques while still achieving an appreciably higher rate of laying.

The invention applies both to the construction of very large galleries for intercontinental tunnels and to laying of pipes for transportation of liquids and all pipelines of intermediate sizes.

As can readily be understood, the invention is not limited to the examples hereinbefore described but extends also to any alternative form of construction.

What is claimed is:

1. A device for utilizing an auxiliary vessel in order to lay pipelines which are submerged at the bottom of the sea and connected to at least one point of the coast, comprising an underwater vehicle provided with means for traveling along the sea bed, means for providing a flexible connection with the vessel, means for fabricating the pipe within the vehicle at least to a partial extent, and means for withdrawing the pipe from the vehicle progressively as it is being fabricated and for placing said pipe on the sea bed, wherein the means for fabricating the pipeline are such that the internal space of the vehicle is in communication with the internal space of the entire pipeline which has already been laid, said means for withdrawing the pipeline from the vehicle comprising two rings of elastic and high-strength material each provided with a selectively inflatable cavity in order to ensure leak-tight cooperation of said ring with said pipeline, at least one of said rings being mounted on an annular piston which is capable of sliding longitudinally with respect to the vehicle, and jack means acting between said piston and the vehicle to withdraw the pipe from the vehicle.

2. A device according to claim 1, wherein said device comprises means for transportation between the vehicle and that end of the pipeline which is located on land, said transportation means being housed within the pipeline which has already been laid.

3. A device according to claim 1, wherein said device comprises within the vehicle handling means for positioning the constituent plates of the pipeline and for assembling said plates in leak-tight manner.

4. A device according to claim 1, wherein the means for withdrawing the pipeline from the vehicle comprise jacks applied on the one hand against a fixed element of the vehicle and on the other hand against a collar fitted with means for clamping against the pipe, synchronization means being provided for displacing said jacks at a speed equal to the speed of forward travel of the vehicle along the sea bed.

5. A device according to claim 1, wherein the vehicle propulsion means comprise orientable caterpillar-track units.

6. A device according to claim 5, wherein the caterpillar-track units can be disassembled and wherein the vehicle is provided with lock-chambers for withdrawing said caterpillar-track units into the interior of the vehicle.

7. A device according to claim 1, wherein the vehicle is mounted on its propulsion means through the intermediary of suspension jacks.

8. A device according to claim 7, wherein the vehicle has disassembly lock chambers above said propulsion means, and the range of travel of the suspension jacks is so determined as to permit upward withdrawal of said propulsion means into the disassembly lock-chambers.

9. A device according to claim 7, wherein said device comprises means for adjusting the longitudinal inclination of the vehicle in order to maintain the outlet orifice of the pipeline at a substantially constant distance from the sea bed.

10. A device according to claim 5, wherein said device comprises horizontal jacks for controlling the orientation of the caterpillar-track units.

11. A device according to claim 1, wherein the sealing means between the pipeline and the vehicle are mounted on a knuckle-joint bearing.

12. A device according to claim 1, wherein said device comprises two lock-chambers for withdrawing from the vehicle two half-collars on each side of the pipeline, means for exerting a thrust on said half-collars in such a manner as to clamp the pipeline, and means for anchoring collar-fastening bolts in the sea bed.

13. A device according to claim 12, wherein the anchoring means comprise drilling rods provided with driving means, the complete assembly being housed within pluggable tubes which are capable of communicating with the interior of the caisson.

14. A device according to claim 1, wherein said device comprises a lock-chamber for withdrawing a bolster from the vehicle and means for thrusting said bolster beneath the pipeline.

15. A device according to claim 1, wherein said device comprises means for cutting a trench in the sea bed and for laying the pipeline within said trench.

16. A device according to claim 15, wherein said device comprises means for transferring the material excavated from the trench and for depositing said material on the pipeline which has been laid.

17. A device according to claim 1 for constructing and installing a twin pipeline, wherein said device comprises a vehicle divided into two twin vehicles, these two vehicles being connected together by means of a U-shaped pipe having its openings on the front faces of said two vehicles.

18. A device according to claim 1, wherein both said rings are mounted on respective annular pistons which are capable of sliding longitudinally with respect of the vehicle, each of said piston being linked to a said jack, said jacks being controlled so as to move in opposite directions relative to each other.

19. A device according to claim 17 or 18, wherein the sealing means comprises a third ring of elastic and high-strength material secured to the vehicle and having a selectively inflatable cavity in order to ensure leak-tight cooperation of said third ring with said pipeline.

* * * * *